United States Patent
Garg et al.

(10) Patent No.: US 9,204,178 B2
(45) Date of Patent: Dec. 1, 2015

(54) CONTENT PRICE AND REVENUE DISTRIBUTION MODEL

(71) Applicant: Verizon Patent and Licensing Inc., Basking Ridge, NJ (US)

(72) Inventors: Siddharth Garg, Delhi (IN); Sambasiva R. Karnati, Flower Mound, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 156 days.

(21) Appl. No.: 13/869,569

(22) Filed: Apr. 24, 2013

(65) Prior Publication Data

US 2014/0325537 A1  Oct. 30, 2014

(51) Int. Cl.
*H04N 7/16* (2011.01)
*H04N 21/2543* (2011.01)
*H04N 21/258* (2011.01)
*H04N 21/442* (2011.01)

(52) U.S. Cl.
CPC ..... *H04N 21/2543* (2013.01); *H04N 21/25866* (2013.01); *H04N 21/44204* (2013.01)

(58) Field of Classification Search
CPC .......................... H04N 7/17318; H04N 7/165
See application file for complete search history.

(56) References Cited

U.S. PATENT DOCUMENTS

| | | | |
|---|---|---|---|
| 2004/0045021 A1* | 3/2004 | Weinblatt et al. | 725/20 |
| 2008/0077950 A1* | 3/2008 | Burke | H04N 7/17318 725/1 |
| 2009/0089184 A1* | 4/2009 | Boush | 705/27 |
| 2010/0036759 A1* | 2/2010 | Ben-Yaacov | G06Q 20/10 705/30 |
| 2014/0040926 A1* | 2/2014 | Maurer et al. | 725/8 |

* cited by examiner

*Primary Examiner* — Alfonso Castro (57) ABSTRACT

A method is performed by one or more devices in a provider network. The method includes providing, to a user device, selected media content (such as television content) from a group of content options available from different content providers. A user device tracks viewer selections and provides the viewer selections as device tracking data that includes a viewing history for the user device. The method includes receiving, from the user device, the device tracking data and generating a billing record, for a user account associated with the user device, that includes a billing amount calculated using the device tracking data. The method includes compiling tracking data from multiple user accounts, including the device tracking data associated with the billing record and calculating, based on the compiled tracking data, proportional revenue shares for the different content providers.

20 Claims, 7 Drawing Sheets

CONTENT PRICE AND REVENUE DISTRIBUTION MODEL

BACKGROUND

Subscription television services typically use a fixed-price model that provides subscribers with unlimited access to a particular set of channels. Service packages may be offered at different price points that include different numbers of available channels. In some cases, only a small number of available channels in a particular service package are actually watched by individual subscribers.

DETAILED DESCRIPTION OF PREFERRED EMBODIMENTS

The following detailed description refers to the accompanying drawings. The same reference numbers in different drawings may identify the same or similar elements.

Systems and/or methods described herein may enable service providers to charge customers for content (e.g., television and/or other digital media content) according to actual viewership. Viewership may be determined based on based on a number of viewers (e.g., for an individual viewing screen), the quantity of content consumed, the variety of content consumed, etc. Content providers may receive payment from service providers based on viewership data. For example, service providers may pay content providers for channels according to how many applicable subscribers watched the channel and/or the number of viewers (e.g., of individual viewing screens) who consumed the content.

In one implementation, one or more devices in a provider network may provide, to a user device, selected media content (such as television content) from a group of content options available from different content providers. The user device may track viewer selections and provide the viewer selections as device tracking data that includes a viewing history for the user device. The devices in the provider network may receive the device tracking data and may generate a billing record, for a user account associated with the user device, that includes a billing amount calculated using the device tracking data. The devices in the provider network may compile tracking data from multiple user accounts, including the device tracking data associated with the billing record and may calculate, based on the compiled tracking data, proportional revenue shares for the different content providers.

As used herein, the terms "user," "consumer," "subscriber," and/or "customer" may be used interchangeably. Also, the terms "user," "consumer," "subscriber," and/or "customer" intended to be broadly interpreted to include a user device or a user of a user device.

Figure 1:
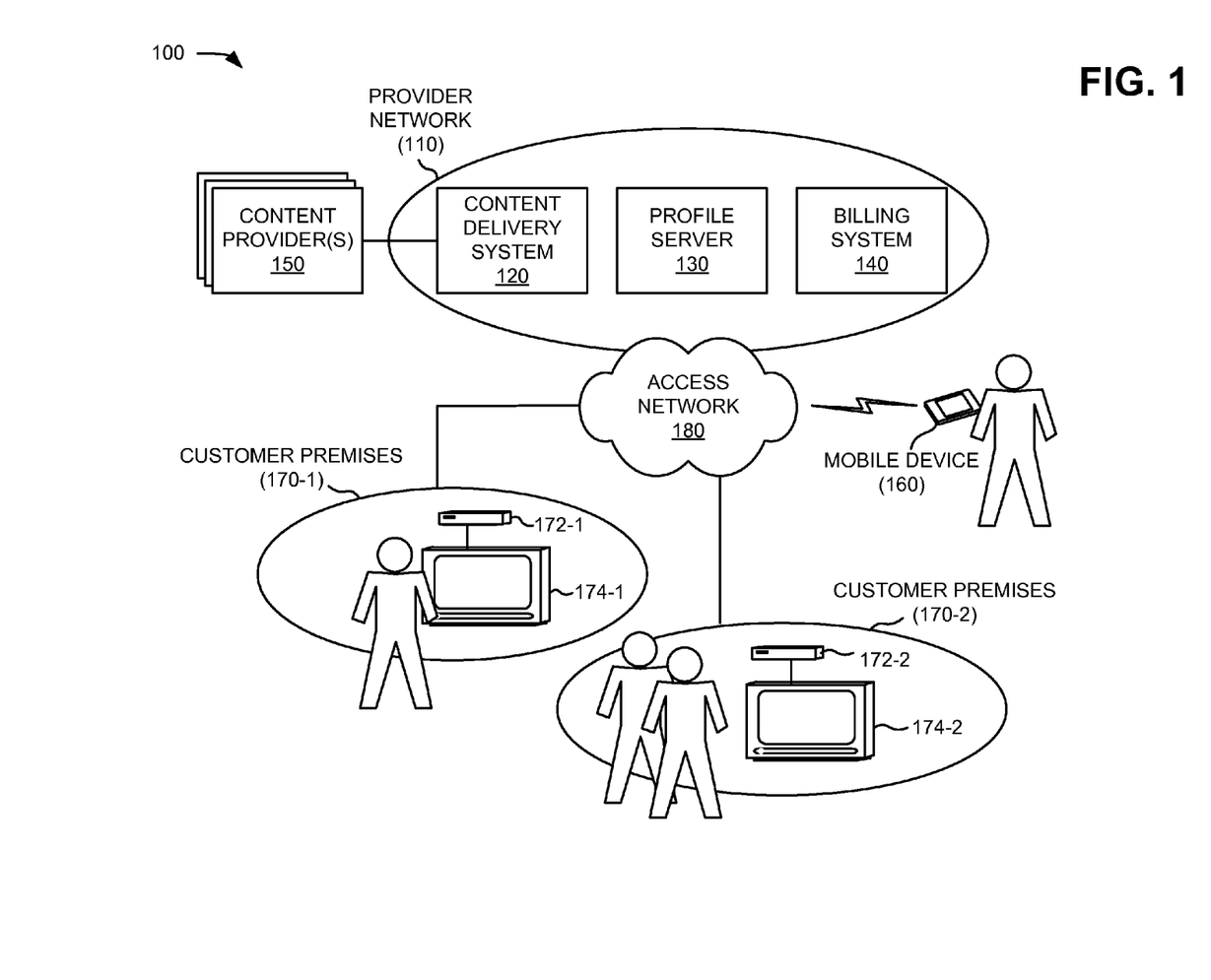
FIG. 1 illustrates an exemplary network in which systems and/or methods described herein may be implemented.

FIG. 1 is a diagram that illustrates an exemplary network 100 in which systems and/or methods described herein may be implemented. As shown in FIG. 1, network 100 may include a provider network 110 with a content delivery system 120, a profile server 130, a billing system 140, one or more content providers 150; a communication device 160; multiple customer premises 170-1 and 170-2 (referred to herein generically as "customer premises 170" and collectively as "customer premises 170"); and an access network 180. Each customer premises may include a media client 172 and a display device 174. Communication device 160 and media client 172 may be referred to herein collectively as "user devices" or generically as a "user device." Devices and/or networks of FIG. 1 may be connected via wired and/or wireless connections.

Provider network 110 may include a network that distributes or makes available services, such as, for example, television services, mobile services, and/or Internet services. Provider network 110 may be a satellite-based network and/or a terrestrial-based network. In implementations described herein, provider network may support television services for customers of provider network 110. Provider network 110 may include, for example, content storage and distribution devices (e.g., content delivery system 120), customer information servers (e.g., profile server 130), billing devices (e.g., billing system 140), application servers, content information servers, security/licensing devices, advertising information servers, etc.

Content delivery system 120 may include one or more network devices, or other types of computation or communication devices, that store and deliver content to customers (e.g., to devices at customer premises 170). The content may include, for example, television broadcasts, VOD programming, or other video content. In one implementation, content delivery system 120 may receive content from content providers 150 and deliver content to particular communication devices and/or particular media clients 172 based on customer selections.

Profile server 130 may include one or more network devices, or other types of computation or communication devices, to store user profile information for users (e.g., users of communication devices 160 and/or media clients 172). The user profile information may include various information regarding a user, such as login information (e.g., a user identifier and a password), billing information, address information, types of services to which the user has subscribed, a list of digital content purchased/rented by the user, a user device identifier (e.g., a media player identifier, a mobile device identifier, a set top box identifier, a personal computer identifier) for media client 172, or the like. Content delivery system 120 may use the user profile information from profile server 130 to authenticate a user and may update the user profile information based on the user's activity. In one implementation, profile server 130 may receive viewing data from communication devices 160 and/or media clients 172, may correlate the viewing data with billable content, may filter the viewing data, and may provide the correlated/filtered data to billing system 140.

Billing system 140 may include one or more network devices, or other types of computation or communication devices, to manage charging users for services provided via network 100. Billing system 140 may also manage revenue calculations for content providers based on customer usage. As described further herein, billing system 140 may include, for example, an account billing module and/or a revenue distribution module.

Content provider 150 may include any type or form of content provider. For example, content provider 150 may include free television broadcasters (e.g., local broadcasters, such as NBC, CBS, ABC, and FOX affiliates), for-pay television broadcasters (e.g., ESPN, HBO, Cinemax, etc.), and/or web-based content providers (e.g., streaming content from web sites). Content from content provider 150 may include linear and/or non-linear content.

Communication device 160 may include a radiotelephone, a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, or other types of computation or communication devices. In an exemplary implementation, communication device 160 may include a device that is capable of communicating over access network 180 and/or via a local wireless network. In implementations described herein, communication device 160 may have the capability to present content from provider network 110 to a user. In one implementation, communication device 160 may also include user or face recognition techniques to enable communication device 160 to determine a number of viewers of presented content.

Customer premises 170 may include devices (e.g., media client 172, display device 174, etc.) and other equipment (such as routers, cables, splitters, etc., not shown) for a home network. Customer premises 170 may connect to provider network 110 via access network 180.

Media client 172 may include a set-top box (STB), a connected television, a laptop computer, a tablet computer, a personal computer, a game console, or other types of computation and/or communication devices. In one implementation, media client 172 may include a client application that allows a user to interact with media client 172 to order and/or receive broadcast content and special-order (e.g., VOD, pay-per-view event, etc.) content. In some implementations, media client 172 may also include a client application to allow video content to be presented on display device 174. Media client 172 may also be capable of sending tracked viewing data to and/or receiving requests from devices in provider network 110.

Media client 172 may be offered as a standalone device or application interface in a multi-purpose device, such as a computer or a smartphone. In some implementations, media client 172 may be incorporated into display device 174. In one implementation, media client 172 may be a closed device (e.g., including a hardware/software configuration that is not accessible to the general public) with a proprietary interface that restricts unauthorized alteration of programming delivered over a closed distribution network. According to an implementation described herein, media client 172 may also include user or face recognition techniques to enable media client 172 to determine a number of viewers of selected content. Additionally, media client 172 may include communication capabilities to send information from media client 172 to devices in provider network 110.

Display device 174 may include a digital or analog display via which a user may view media content (including, for example, television content). Display device 174 may refer to any device that can receive and display multimedia content delivered over access network 180 and/or through media client 172 for perception by users.

Access network 180 may generally include a local area network (LAN), a wide area network (WAN), a metropolitan area network (MAN), a wireless network, an optical fiber (or fiber optic)-based network, a cable television network, a satellite television network, or a combination of networks. In one implementation, access network 180 may include an Internet Protocol (IP)-based network. In some implementations, access network 180 may be a private network controlled by, for example, a telecommunications company that provides television, telephone, and/or data access to customer premises network 170. In another implementation, access network 180 may be a public network, such as the Internet, or a combination of public and private networks. According to implementations described herein, access network 180 may include a closed distribution network. The closed distribution network may include, for example, cable, optical fiber, satellite, or virtual private networks that restrict unauthorized alteration of content delivered by a service provider. For example, the closed distribution network may be implemented by closed devices (e.g., a media client 172) or through use of secure/encrypted network communications with other user devices (e.g., communication devices 160). Access network 180 may also support communications between provider network 110 and communication devices 160/media clients 172 using, for example, IP standards.

Techniques described herein may be used to allow service providers to provide content delivery pricing and revenue distribution based on actual customer usage. Users (e.g., users of communication device 160 or media client 172) may register for a subscription plan that accrues charges based on actual viewership. In operation, a network 100 may be used to provide selected content to communication device 160 and/or media client 172 (e.g., via content delivery system 120 and access network 180). Communication device 160 and media client 172 may track the times and channels viewed (generally referred to herein as "viewing data") and, in some instances, the number of viewers (generally referred to as "viewer data"). Communication device 160 and media client 172 may provide the viewing data and the viewer data back to provider network 110. Devices in provider network 110 (e.g., profile server 130 and billing system 140) may associate the viewing data and the viewer data with particular user accounts to generate customer bills. Billing system 140 may also calculate revenue distribution for particular content providers based on usage by customers of the usage-based subscription plans.

Although FIG. 1 shows exemplary components of network 100, in other implementations, network 100 may include fewer components, different components, differently arranged components, or additional components than depicted in FIG. 1. For example, there could be thousands of communication devices 160 and/or customer premises 170. Also, in some instances, a component of network 100 may perform one or more functions described as being performed by another component or group of components of network 100.

Figure 2:
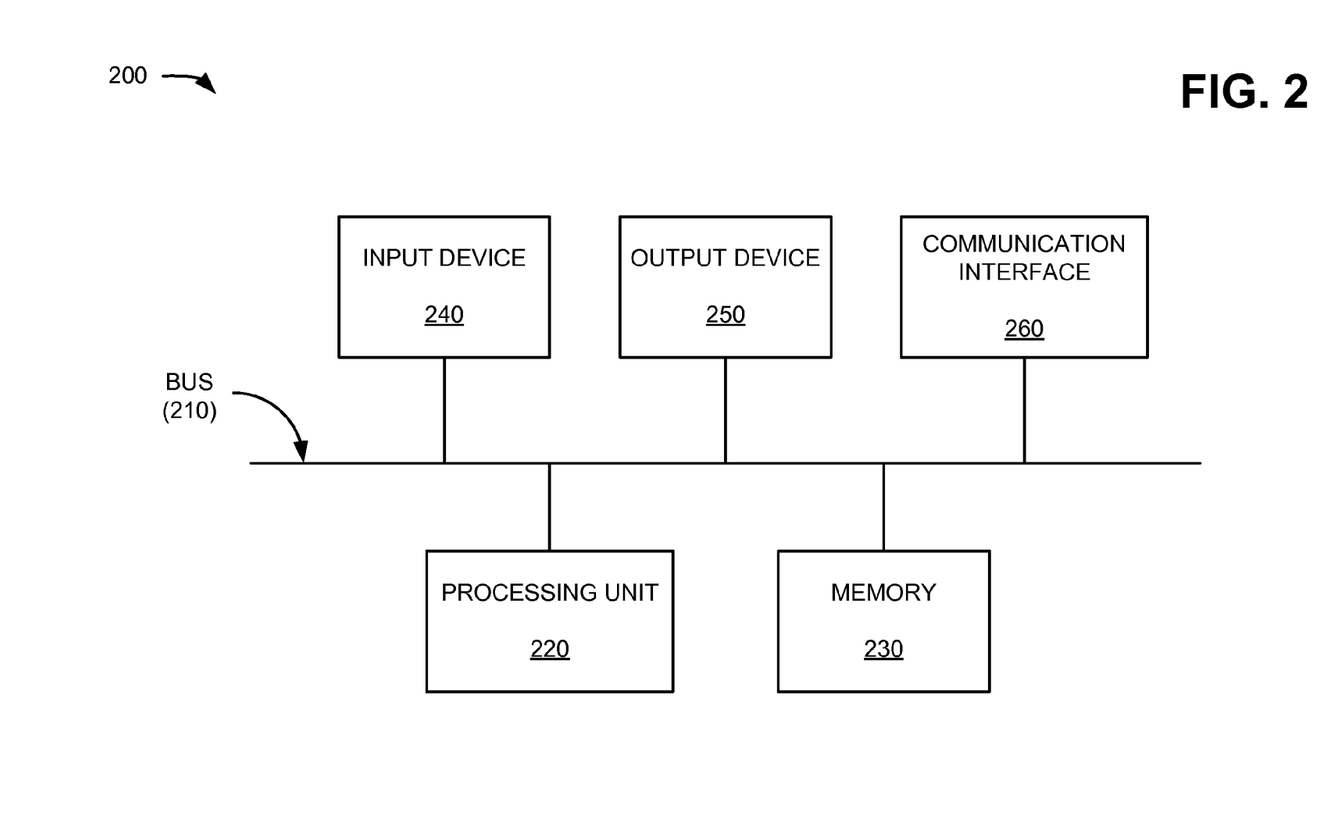
FIG. 2 is a diagram of exemplary components of a device that may be used within the network of FIG. 1.

FIG. 2 is a diagram of exemplary components of a device 200. Device 200 may correspond to content delivery system 120, profile server 130, billing system 140, communication device 160, or media client 172. Each of content delivery system 120, profile server 130, billing system 140, communication device 160, or media client 172 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver (e.g., a transmitter and/or receiver) that enables device 200 to communicate with other devices and/or systems. For example, communication interface 260 may include mechanisms for communicating with other devices, such as other devices of network 100 or another device 200.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
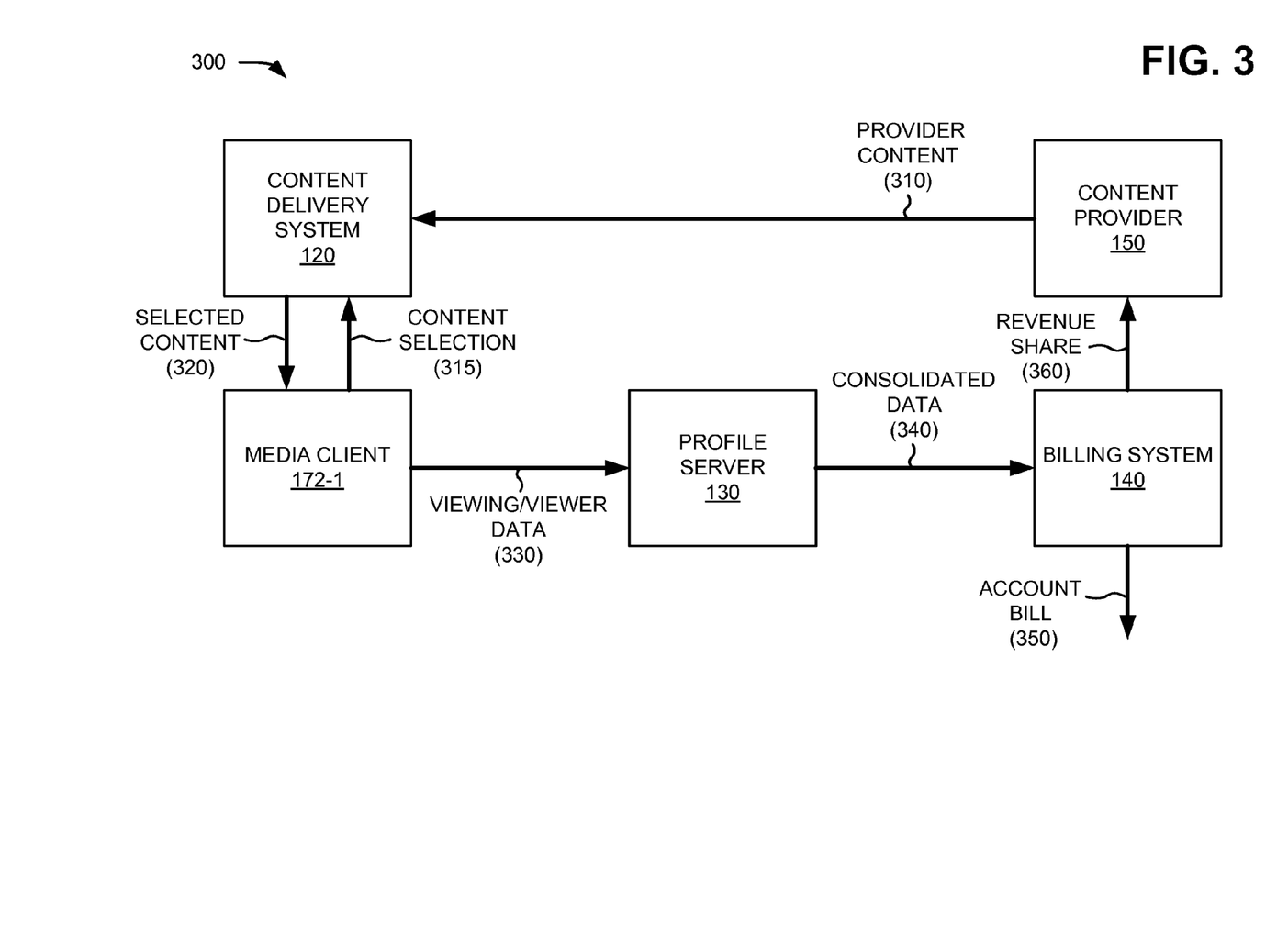
FIG. 3 is a diagram of exemplary interactions between components of an exemplary portion of the network depicted in FIG. 1.

FIG. 3 depicts a diagram of exemplary interactions among components of an exemplary portion 300 of network 100. As illustrated, network portion 300 may include content delivery system 120, profile server 130, billing system 140, content provider 150, and media client 172-1. Content delivery system 120, profile server 130, billing system 140, content provider 150, and media client 172-1 may include the features described above in connection with FIGS. 1 and 2.

As shown in FIG. 3, content provider 150 may send provider content 310 to content delivery system 120. Provider content 310 may include, for example, live or recorded content that a service provider can make available (along with other content from other content providers) to subscribers.

Content delivery system 120 may receive provider content 310 from content provider 150 and may format, categorize, and/or process provider content 310 to make the content available to subscribers (such as users of media client 172-1) upon selection.

Media client 172-1 may provide a content selection 315 to content delivery system 120. For example, a user of media client 172-1 may tune to a particular channel or otherwise select particular content to view (e.g., on display 174) via media client 172. In one implementation, media client 172-1 may limit user selections to those channels available in a particular subscription package. In another implementation, content delivery system 120 may prevent distribution of particular channels, such as channels showing content subject to regional blacked-outs, subscription limits, or other restrictions.

In response to content selection 315, content delivery system 120 may provide selected content 320 to media client 172-1. Media client 172-1 may receive selected content 320 and enable presentation of selected content 320 to a user. According to implementations described herein, media client 172-1 may record viewing data, including, for example, particular viewing times and particular channels or content watched. In another implementation, media client 172-1 may collect viewer data that may include the number of people viewing content on a particular display 174-1. For example, media client 172-1 may employ depth cameras, motion sensing technology, facial recognition, and/or other technologies, to identify a number of people in front of media client 172-1 and/or display 174-1. Media client 172-1 may, for example, identify a particular number of viewers (e.g., one or more) or simply distinguish between one and multiple viewers.

Media client 172-1 may store the viewing data and/or viewer data and provide the viewing data and/or viewer data to profile server 130 as viewing/viewer data 330. In one implementation, media client 172-1 may provide viewing/viewer data 330 to profile server 130 at periodic intervals (e.g., daily). In another implementation, media client 172-1 may provide viewing/viewer data 330 in response to a polling query from profile server 130. In still other implementations, media client 172-1 may provide viewing/viewer data 330 in response to a user action, such as providing data as part of a start-up, login, logoff, or shut-down routine.

In one implementation, viewing/viewer data 330 may include "raw" data that may track every tuning action (e.g., channel surfing, guide channels, etc.). In one implementation, viewing/viewer data 330 may simply include channel/time information without reference to particular content. In another implementation, viewing/viewer data 330 may identify a particular program and/or content provider associated with channel/time information. In another implementation, media client 172-1 may be configured to filter viewing/viewer data 330 based on certain criteria (e.g., a threshold time period on a tuned channel or a threshold time period for a person count in front of display 174-1). For example, media client 172-1 may not log a viewing or tuning instance unless the content is presented for at least 10 seconds. Alternatively, or additionally, media client 172-1 may apply an accumulated threshold (over multiple tunings) for time on a particular channel or download stream before reporting the data.

Profile server 130 may receive viewing/viewer data 330. Profile server 130 may perform various filtering, formatting, look-ups, and/or calculations to match viewing/viewer data 330 to billable information. For example, profile server 130 may apply initial and/or additional data filtering of viewing/ viewer data 330. In one instance, if communication device 160 or media client 172 reports raw data, profile server 130 may apply data filtering described herein with respect to media client 172. Additionally, or alternatively, profile server 130 may associate channel data with particular programs and/or content providers. Profile server 130 may consolidate viewing/viewer data 330 from multiple communication devices 160/media clients 172 associated with a single subscriber account. The consolidated viewing/viewer data may be provided to billing system 140 as consolidated data 340.

Billing system 140 may receive consolidated data 340 for each subscriber account. In one implementation, billing system 140 may generate a customer account bill 350 based on consolidated data 340. For example, billing system 140 may apply rates to consolidated data 340, and/or add surcharges, subscription fees, etc. to calculate billing amounts. In another implementation, billing system 140 may extrapolate consolidated data 340 from multiple subscriber accounts to determine actual revenue sharing with content provider 150. A calculated revenue share 360 may then be sent to each content provider 150.

Although FIG. 3 shows exemplary components of network portion 300, in other implementations, network portion 300 may include fewer components, different components, differently-arranged components, and/or additional components than depicted in FIG. 3. For example, although features of FIG. 3 are described in the context of using media client 172-1, communications device 160 may perform similar operations as those described above with respect to media client 172-1. Alternatively, or additionally, one or more components of network portion 300 may perform one or more other tasks described as being performed by one or more other components of network portion 300.

Figure 4:
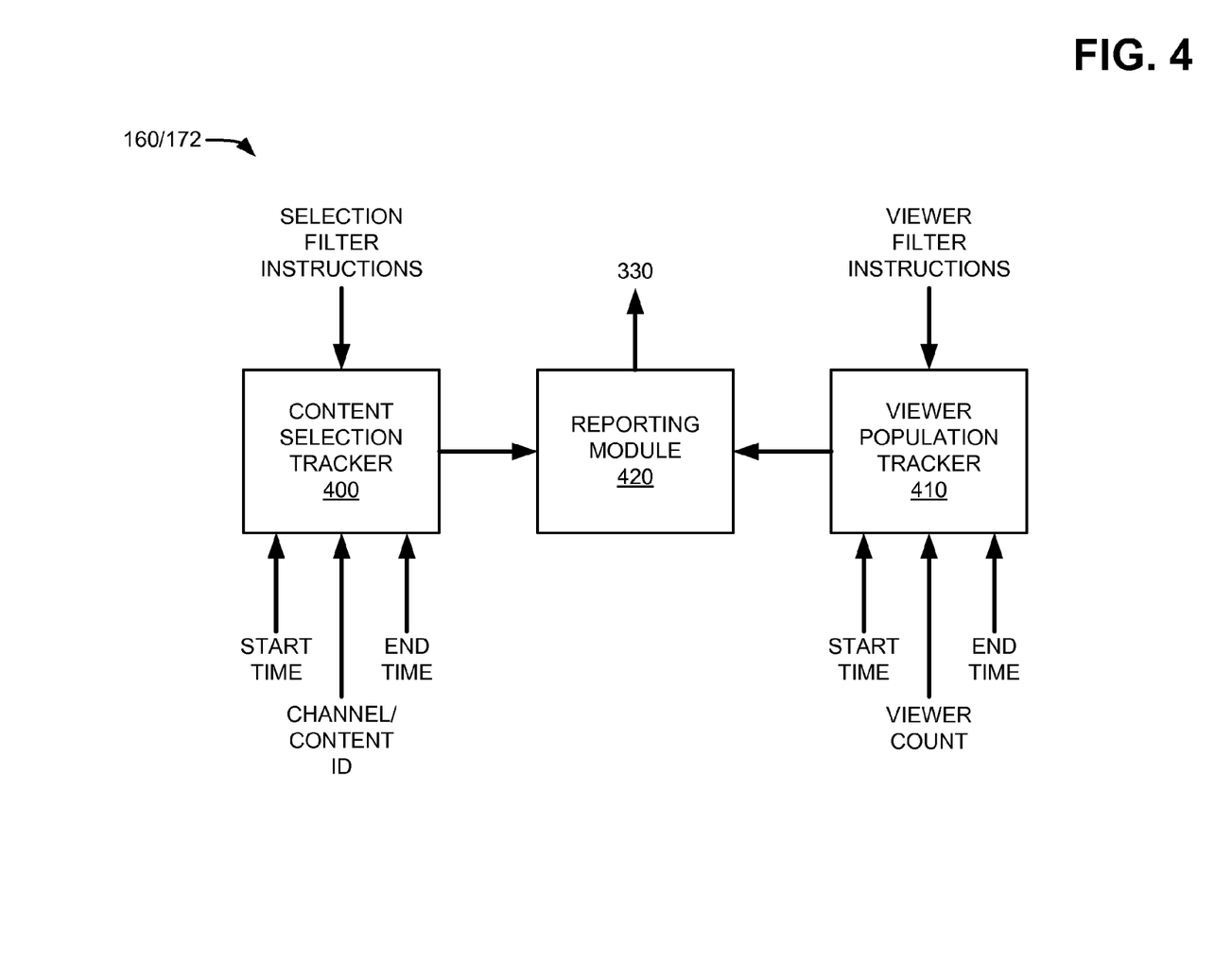
FIG. 4 is a diagram of exemplary functional components of a communication device and/or a media client of FIG. 1.

FIG. 4 is a functional block diagram of exemplary components of communication device 160 or media client 172. As shown in FIG. 4, communication device 160/media client 172 may include a content selection tracker 400, a viewer population tracker 410, and a reporting module 420. Functions of content selection tracker 400, viewing population tracker 410, and reporting module 420 may be performed by components of one or more devices 200.

Content selection tracker 400 may track and record a viewing history of content received from content delivery system 120. For example, content selection tracker 400 may track an amount of time or actual time periods that media client 172 is tuned to a particular channel. For example, content selection tracker 400 may identify a start time and an end time that a particular channel is tuned. In another implementation, content selection tracker 400 may simply track the amount of time or actual time periods that content is being presented (irrespective of a channel selection) by media client 172. In still another implementation, content selection tracker 400 may track the duration of a particular media stream or downloaded file presented to a user on communication device 160. Additionally, or alternatively, content selection tracker 400 may track that a channel has been viewed (e.g., for at least a threshold time period) within a billing cycle period. In another implementation, another identifier for a content provider or for particular content (e.g., a code extracted from content metadata) may be used in addition to or in place of a channel identifier.

In one implementation, content selection tracker 400 may apply data collection criteria to eliminate superfluous data. For example, content selection tracker 400 may apply channel filter instructions (e.g., supplied from service provider network 110) to filter out instances of short-term tuning (e.g., less than a few seconds) that may be indicative of channel surfing. In one implementation, content selection tracker 400 may also filter out, for example, tuning of non-revenue generating channels, such as promotional channels, program guide channels, etc.

Content selection tracker 400 may also identify particular programs viewed on particular channels. For example, within a single sixty-minute viewing period on a single channel (e.g., FOX network affiliate), content selection tracker 400 may record fifteen minutes of time for "The Simpsons," thirty minutes for "Bob's Burgers," and fifteen minutes for "Family Guy." As described further herein, particular program and/or time information be used, for example, to identify premium rates or premium content in a tiered billing system. Content selection tracker 400 may provide selection data to reporting module 420.

Viewer population tracker 410 may track and record a viewer history (e.g., a number of viewers of a particular device) during presentation of content from content delivery system 120. For example, viewer population tracker 410 may track how many viewers are watching content on a particular device during time periods that media client 172 is tuned to a particular channel. Viewer population tracker 410 may user real-time viewer data or estimations to determine a number of viewers. For example, viewer population tracker 410 may record a number of users identified in front of display device 174 when media client 172 is presenting content. In one implementation, viewer population tracker 410 may use data from depth cameras, motion sensing technology, facial recognition, and/or other technologies to identify a number of people in front of media client 172-1 and/or display 174-1. In another implementation, viewer population tracker 410 may estimate a number of viewers based on subscriber account information (such as number of different user accounts associated with a particular subscriber, the number of active media clients 172 and/or display devices 174 in a household at a particular time, or other demographic information) and statistics from multiple subscribers (e.g., time of day, ages, household size, etc.) to determine an average number of viewers that correspond to the actual number of different accounts. Viewer population tracker 410 may provide viewer data to reporting module 420.

Reporting module 420 may collect data from content selection tracker 400 and viewer population tracker 410 to provide the data to provider network 110 (e.g., profile server 130). Reporting module 420 may consolidate selection data from content selection tracker 400 and viewer data from viewer population tracker 410. Reporting module 420 may also identify discrete time increments that may be used for billing. A discrete time increment may present a increment for which the same billing criteria may be applied (e.g., by billing system 140). For example, a discrete time increment may include a content presentation period where the channel and number of viewers are consistent. In one implementation, reporting module 420 may provide data to provider network 110 at assigned periodic intervals. In other implementations, reporting module 420 provide data in response to a polling query from profile server 130, in response to a user action (e.g., as part of a start-up, login, logoff, or shut-down routine), based on memory capacity (e.g., whenever a certain cache memory threshold is reached), or a combination of factors.

Although FIG. 4 shows exemplary functional components of communication device 160/media client 172, in other implementations, communication device 160/media client 172 may include fewer functional components, different functional components, differently-arranged functional components, and/or additional functional components than depicted in FIG. 4. Alternatively, or additionally, one or more functional components of communication device 160/media client 172 may perform one or more other tasks described as being performed by one or more other components of communication device 160/media client 172. Furthermore, in other implementations, some functions of content selection tracker 400 and/or viewer population tracker 410 (such as certain data manipulation and/or estimation functions) may be implemented by devices in provider network 110 (e.g., profile server 130).

Figure 5:
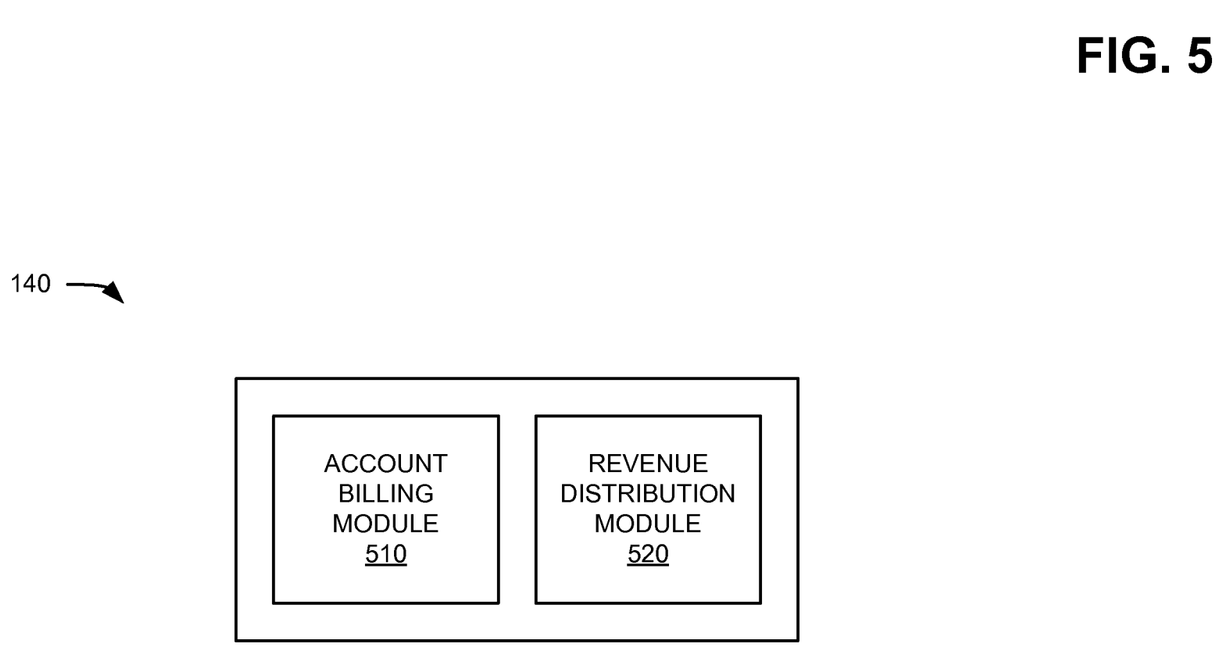
FIG. 5 is a diagram of exemplary functional components of a billing system of FIG. 1.

FIG. 5 is a functional block diagram of exemplary components of billing system 140. As shown in FIG. 5, billing system 140 may include an account billing module 510 and a revenue distribution module 520. Functions of account billing module 510 and revenue distribution module 520 may be performed by components of one or more devices 200.

Billing module 510 may link data received from profile server 130 to billing data. For example, billing module 510 may receive consolidated data 340 from profile server 130 for a particular subscriber account and a particular billing cycle (e.g., a one-month period). Billing module 510 may retrieve billing rates for the particular subscriber and apply the billing rates to consolidated data 340. In one implementation, billing module 510 may apply one or more billing rate multipliers to billing rates to discrete increments of consolidated data 340.

Figure 6:
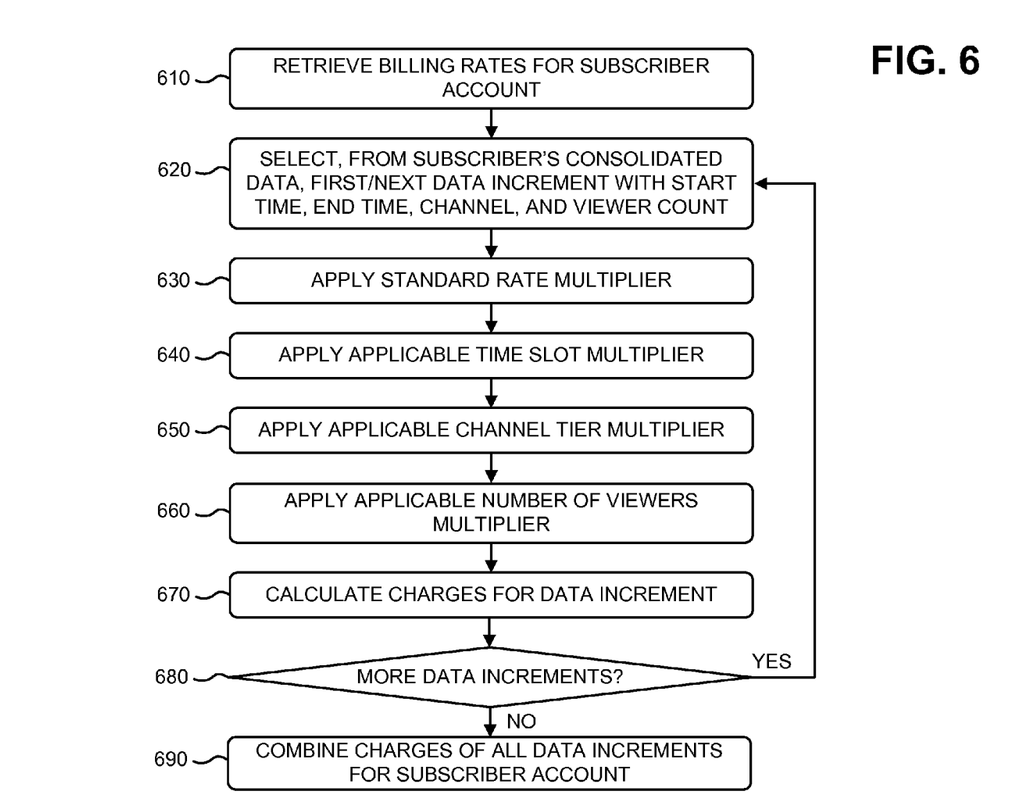
FIG. 6 is a flowchart of an exemplary process for adding billing rate multipliers to consolidated data, according to an implementation described herein.

FIG. 6 provides an example of a process flow for adding billing rate multipliers to consolidated data 340. As shown in FIG. 6, billing module 510 may retrieve billing rates for a particular subscriber account (block 610). For example, billing module 510 may retrieve, from a database, billing rates for a particular subscriber account (e.g., that corresponds to consolidated data 340 for that subscriber). Subscriber billing rates may provide a simple time-based subscription rate for viewed content and/or variable rates based on different criteria.

Subscription billing rates may include, for example, a standard rate and, optionally, additional service multipliers to indicate time slots, channel tiers, and/or number of viewers. A standard rate may include, for example, an hourly rate (e.g., $1 per hour) applied to the amount of time content was presented/viewed by media client 172. A time slot multiplier may represent a premium (+10 percent) for certain viewing times (e.g., prime time hours) or discount (e.g., −10 percent) for certain viewing times (e.g., mornings/weekends). A channel tier multiplier may represent a premium (+50 percent) for certain types of channels available from provider network 110 (e.g., any channels which may not be part of a basic television subscription package). A number of viewers multiplier may represent a premium based on the number of viewers detected (e.g., +50 percent for two viewers, +75 percent for three viewers, etc.) and/or based on an estimated average number of people (e.g., 1.2 viewers on average). In another example, a number of viewers multiplier may simply distinguish between an individual and a group rate.

As shown in FIG. 6, billing module 510 may select, from the subscriber's consolidated data, a data increment with a particular start time, end time, channel, and/or viewer count (block 620). For example, billing module 510 may select a data increment (e.g., from consolidated data 340) based that is consistent for applicable multipliers in the subscriber billing rates. For example, if the subscriber billing rate includes separate rates for channel tiers and number of viewers, a data increment may include a time period from a start time to an end time of viewing the same channel by the same number of viewers. Conversely, if the subscriber billing rate includes only a flat hourly rate, the subscriber's consolidated data for the billing cycle may be treated as a single data increment. In some implementations, data increments may be identified by communication device 160, media client 172, or profile server 130 before consolidated data 340 is provided to billing system 140.

As further shown in FIG. 6, billing module 510 may apply, to the selected data increment, the standard rate multiplier from the subscriber's billing rate (block 630) and any other multiples that may also be applicable to the selected data increment (block 640-660). Billing module 510 may then compile the applicable multipliers to calculate charges for the selected data increment (block 670). Assume, for example, the subscriber billing plan includes a 25 cent per hour standard rate with a 25 cent per hour premium for movie channels and a 50 cent per hour premium for groups of viewers (e.g., 4 or more viewers). Assume further, the selected data increment includes a two-hour time period of movie channel content viewed by two or more people. Billing module 510 would compile the applicable standard rate, movie channel premium, and group premium to determine a billing multiple (e.g., 1 dollar per hour) for the selected data increment. Billing module 510 could then calculate a charge of two dollars for the selected data increment (e.g., one dollar per hour for two hours).

As shown in blocks 680 and 690 of FIG. 6, billing module 510 may repeat the calculations above for additional selected data increments, so that each data increment has consistent time slots, channel tiers, and/or numbers of viewers. When charges for all data increments have been calculated, billing module 510 may combine the calculated charges into a single billed amount for the viewing history (e.g., as represented by consolidated data 340) of the subscriber's account.

Although FIG. 6 shows an exemplary process for calculating billing amounts based on a collected viewing history, in other implementations, additional, fewer, or different steps may be used than depicted in FIG. 6. For example, in other implementations, billing amounts may be based only on the number of hours of content consumed (e.g., regardless of channel), only on the number of viewers, only on the number of channels watched (e.g., regardless of duration), or combinations thereof.

Returning to FIG. 5, billing module 510 may apply any base subscription fee (if applicable) to the calculated charges to determine a complete television billing record for a particular user and/or account. Billing module 510 may forward the television billing record to another system, such as a mediation system, to be combined with other record types (e.g., voice, data, wireless, etc.) in a consolidated database and eventually included in a customer bill.

Revenue distribution module 520 may link data from profile server 130 and/or billing module 510 to revenue models. For example, revenue distribution module 520 may receive consolidated data 340 from profile server 130 or data increments from billing module 510 for a particular subscriber account and a particular billing cycle (e.g., a one-month period). In one implementation, revenue distribution module 520 may compile tracking data from multiple user accounts (e.g., multiple instances of consolidated data 340 for different user accounts). Revenue distribution module 520 may use this information to determine, for example, a percentage of billing revenue attributable to each channel/content provider. In one implementation, revenue distribution module 520 may apply the percentage to a portion of the billing totals that are to be collected from subscribers (e.g., a portion remaining after expenses, etc.) to determine a revenue share for a content provider.

Although FIG. 5 shows exemplary functional components of billing system 140, in other implementations, billing system 140 may include fewer functional components, different functional components, differently-arranged functional components, and/or additional functional components than depicted in FIG. 5. Alternatively, or additionally, one or more functional components of billing system 140 may perform one or more other tasks described as being performed by one or more other components of billing system 140.

Figure 7:
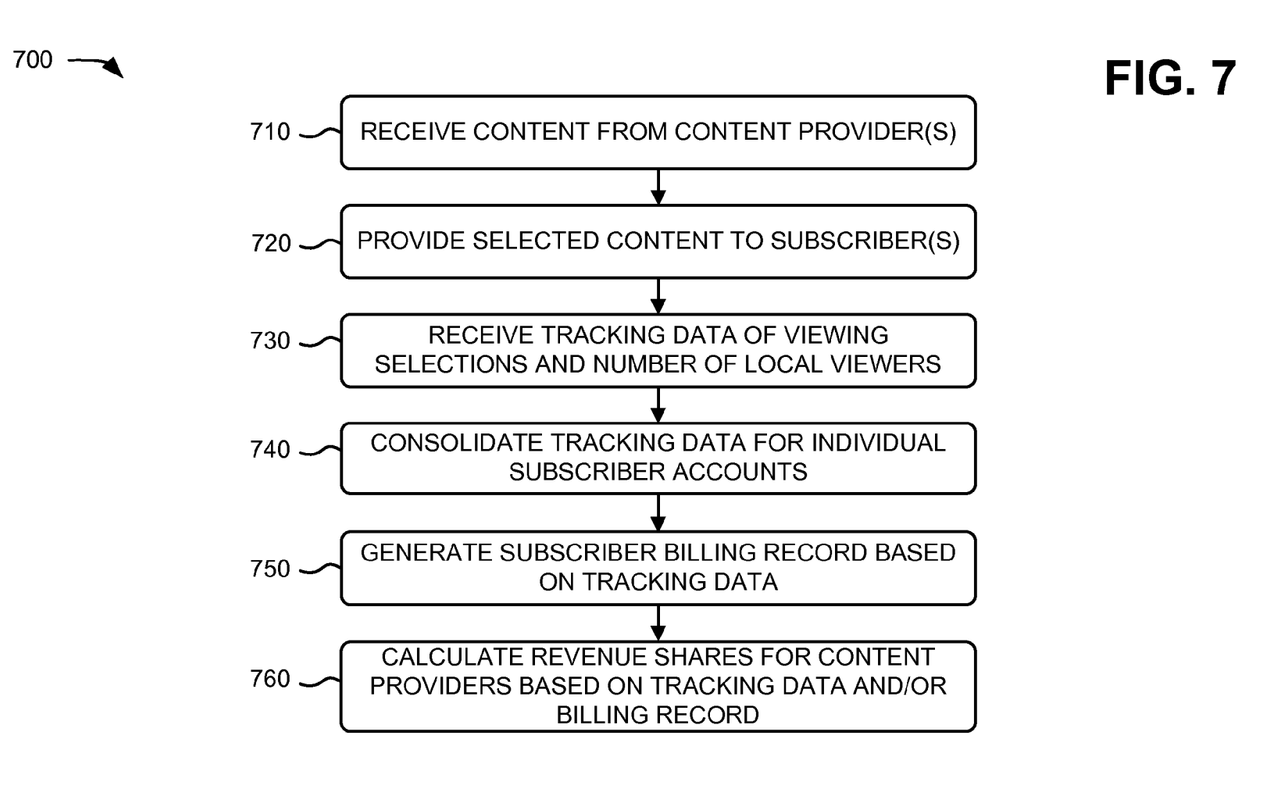
FIG. 7 is a flowchart of an exemplary process for determining usage-based billing and revenue distribution, according to an implementation described herein.

FIG. 7 is a flow chart of an exemplary process 700 for determining usage-based billing and revenue distribution, according to an implementation described herein. In one implementation, process 700 may be performed by one or more devices of provider network 110. In another implementation, one or more blocks of process 700 may be performed by one or more other devices or a group of devices including or excluding devices of provider network 110.

Process 700 may include receiving content from one or more content providers (block 710) and providing selected content to subscribers (block 720). For example, content delivery system 120 may receive provider content 310 from content provider 150 and may make the content available to subscribers (such as users of media client 172-1) upon selection. Media client 172-1 may provide a user's content selection 315 to content delivery system 120. In response to content selection 315, content delivery system 120 may provide selected content 320 to media client 172-1.

Process 700 may further include receiving tracking data of subscriber viewing selections and number of local viewers (block 730), and consolidating the tracking data for individual subscriber accounts (block 740). For example, profile server 130 may receive viewing/viewer data 330 from communication device 160/media client 172. Profile server 130 may perform various filtering, formatting, look-ups, and/or calculations to match viewing/viewer data 330 to billable information. Additionally, or alternatively, profile server 130 may associate viewing/viewer data 330 with particular programs and/or content providers. Profile server 130 may consolidate viewing/viewer data 330 from multiple communication devices 160/media clients 172 associated with a single subscriber account. The consolidated viewing/viewer data may be provided to billing system 140 as consolidated data 340.

Process 700 may also include generating a subscriber billing record based on the tracking data (block 750). For example, billing system 140 may receive consolidated data 340 for each subscriber account. In one implementation, billing system 140 may generate a customer account bill 350 based on consolidated data 340. Billing system 140 (e.g., account billing module 510) may apply rates to consolidated data 340, and/or add surcharges, subscription fees, etc. to calculate billing amounts.

Process 700 may additionally include calculating revenue shares for content providers based on the tracking data and/or the billing record (block 760). For example, billing system 140 (e.g., revenue distribution module 520) may extrapolate consolidated data 340 from multiple subscriber accounts to determine actual revenue sharing with content provider 150.

Systems and/or methods described herein may provide, to a user device, selected media content from a group of content options available from different content providers and may receive, from the user device, device tracking data. The device tracking data may include a viewing history for the user device. The systems and/or methods may consolidate the device tracking data with additional device tracking data from other user devices to provide consolidated tracking data for the user account and may generate a billing record for the user account, wherein the billing record includes a billing amount that is calculated using the consolidated tracking data.

Implementations described herein may provide a flexible price and revenue distribution model that permits service providers to charge customers based on customer viewing activity instead of pre-paid packages. Such models may prove attractive for subscribers who are reluctant to enroll in a pre-paid subscription plan. Implementation of such models may also allow content providers to receive compensation for use by subscribers.

The foregoing description provides illustration and description, but is not intended to be exhaustive or to limit the invention to the precise form disclosed. Modifications and variations are possible in light of the above teachings or may be acquired from practice of the invention. For example, while series of blocks has been described with respect to FIGS. 6 and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
providing, by one or more network devices and to a user device associated with a particular subscriber account, selected media content from a group of content options available from different content providers;
receiving, by one of the one or more network devices and from the user device, device tracking data, wherein the device tracking data includes a viewing history, for the user device, that identifies a number of viewers of a viewing screen of the user device;
retrieving, by one of the one or more network devices, billing rates for the particular subscriber account, the billing rates including multipliers for a standard rate, a time slot, a channel tier, and a number of viewers;
identifying, by one of the one or more network devices, data increments within the device tracking data, each of the data increments including a time increment that is applicable to a same combination of the multipliers from the billing rates;

generating, by one of the one or more network devices, a billing record for the particular subscriber account, wherein the billing record includes a billing amount that is calculated by applying the multipliers to the data increments;

compiling, by one of the one or more network devices, the device tracking data with tracking data from multiple other user accounts to form compiled tracking data; and calculating, by one of the one or more network devices, based on the compiled tracking data, proportional revenue shares for the different content providers.

2. The method of claim 1, further comprising:
consolidating the device tracking data with additional device tracking data from other user devices associated with the subscriber account, wherein the billing amount is further calculated using the additional device tracking data.

3. The method of claim 1, wherein the viewing history includes:
an estimated average number of viewers for each time increment, based on subscriber account information.

4. The method of claim 3, wherein the estimated average number of viewers distinguishes between one and multiple viewers for each time increment.

5. The method of claim 1, wherein the viewing history further includes:
a record of a number of channels on which the selected media content was viewed.

6. The method of claim 1, wherein the user device includes a closed device with a proprietary interface to a provider network.

7. The method of claim 1, further comprising:
collecting, by the user device, the device tracking data;
storing, by the user device, the device tracking data; and
sending, by the user device and to one of the one or more network devices, the device tracking data.

8. The method of claim 1, further comprising:
applying, by the user device and to the tracking data, a data filter that includes one of:
a threshold time per tuning incident, or
a cumulative threshold time per tuned channel.

9. The method of claim 1, wherein providing the selected media content includes one or more of:
providing media content to the user device via a closed distribution network, or
streaming media content to the user device via a secure connection over a public network.

10. One or more network devices, comprising:
one or more memories to store a plurality of instructions; and
one or more processors configured to execute instructions in the one or more memories to:
provide, to a user device associated with a particular subscriber account, selected media content from a group of content options available from different content providers;
receive, from the user device, device tracking data, wherein the device tracking data includes a viewing history, for the user device, that identifies a number of viewers of a viewing screen of the user device;
retrieve billing rates for the particular subscriber account, the billing rates including multipliers for a standard rate, a time slot, a channel tier, and a number of viewers;
identify data increments within the device tracking data, each of the data increments including a time increment that is applicable to a same combination of the multipliers from the billing rates; and
generate a billing record for the particular subscriber account, wherein the billing record includes a billing amount that is calculated by applying the multipliers to the data increments.

11. The one or more network devices of claim 10, wherein the one or more processors are further configured to execute instructions in the one or more memories to:
compile the device tracking data with tracking data from multiple other user accounts to form compiled tracking data; and
calculate, based on the compiled tracking data, proportional revenue shares for the different content providers.

12. The one or more network devices of claim 10, wherein the viewing history includes:
an estimated average number of viewers for each time increment, based on subscriber account information.

13. The one or more network devices of claim 12, wherein the estimated average number of viewers distinguishes between one and multiple viewers for each time increment.

14. The one or more network devices of claim 10, wherein the viewing history further includes:
a record of a number of channels on which the selected media content was presented during a particular time period.

15. The one or more network devices of claim 10, the one or more processors are further configured to execute instructions in the one or more memories to:
receive the viewing history at periodic intervals,
receive the viewing history based on user activity, or
send a polling query to request the viewing history.

16. A method, comprising:
receiving, by a user device, selections of media content from a group of content options available from different content providers;
sending, by the user device and to a remote network device, requests for the selected media content;
receiving, by the user device, the selected media content;
presenting, via a viewing screen of the user device, the selected media content;
logging, by the user device, device tracking data,
wherein the device tracking data includes a viewing history of the selected media content for the user device, and
wherein the viewing history includes distinct time increments for when the selected media content was presented by the user device, each of the distinct time increments including a number of viewers viewing the viewing screen of the user device, and a content provider identifier;
sending, by the user device and to the remote network device, the device tracking data;
retrieving, by a network device, billing rates for a particular subscriber account for the user device, the billing rates including multipliers for a standard rate, a time slot, a channel tier, and a number of viewers;
applying, by the network device, different combinations of the multipliers from the billing rates to the distinct time increments; and
generating, by a network device and based on the applying of the different combinations of the multipliers, a billing record for the particular subscriber account.

17. The method of claim 16, wherein logging the device tracking data with the viewing history further includes using one or more of depth cameras, motion sensing technology, and facial recognition to identify the number of viewers viewing the viewing screen of the user device.

18. The method of claim 16, wherein the viewing history further includes:
   a record of a number of channels on which the selected media content was presented.

19. The method of claim 16, further comprising;
   storing, by the user device, the device tracking data, wherein sending the device tracking data includes sending the stored device tracking data:
   on a periodic basis,
   when triggered by a user event, or
   when requested by the remote network device.

20. The method of claim 18, wherein the user device includes one or more of:
   a media client for a television display, or
   a communication device configured to present streaming media from a service provider.

* * * * *